US005399421A

United States Patent [19]

Cascino

[11] Patent Number: 5,399,421

[45] Date of Patent: Mar. 21, 1995

[54] VINYL FILM STENCIL

[75] Inventor: Lawrence A. Cascino, South Bend, Ind.

[73] Assignee: Gaska Tape, Inc., Elkhart, Ind.

[21] Appl. No.: 136,329

[22] Filed: Oct. 13, 1993

Related U.S. Application Data

[62] Division of Ser. No. 790,760, Nov. 12, 1991, abandoned.

[51] Int. Cl.[6] .......... C09J 7/02

[52] U.S. Cl. .......... 428/261; 428/343

[58] Field of Search .......... 428/343, 261, 354, 40; 524/297, 430, 492, 847

[56] References Cited

U.S. PATENT DOCUMENTS

| | | | |
|---|---|---|---|
| 2,270,944 | 1/1942 | Frick | 428/40 |
| 2,776,984 | 1/1957 | Mention | 260/475 |
| 3,635,752 | 1/1972 | Baer | 117/100 S |
| 4,051,039 | 3/1977 | Segal | 428/297 |
| 4,223,054 | 9/1980 | Schramer | 428/40 |
| 4,301,060 | 11/1981 | Underwood | 260/42.49 |
| 4,443,500 | 4/1984 | deJori | 427/264 |
| 4,612,737 | 9/1986 | Adee | 51/310 |
| 4,627,993 | 12/1986 | Loomis | 428/36 |
| 5,043,369 | 8/1991 | Bahn | 523/466 |
| 5,077,336 | 12/1991 | Nakashita | 524/732 |

*Primary Examiner*—Jenna L. Davis

*Attorney, Agent, or Firm*—R. Steven Linne

[57] ABSTRACT

A plasticized vinyl film which is formulated for use as a stencil in stonecutting, sand blasting and other etching type procedures. The film includes, in addition to resin and plasticizer components, a quantity of ceramic fibers sufficient to impart a sufficient strength to the film so that it may be used for its intended purpose.

4 Claims, 1 Drawing Sheet

VINYL FILM STENCIL

This is a divisional of application Ser. No. 07/790,760, filed on Nov. 12, 1991, now abandoned.

SUMMARY OF THE INVENTION

This invention relates to films and will have special application to a vinyl film suited for use as a stencil in said blasting or similar operations.

Stone cutting stencils have been in use for some time. Normally, these stencils are made of calendared rubber or similar materials able to withstand the abrasion and temperature of sand blasting, which is the most widely used stone cutting method. One problem with currently available stencils is difficulty in visual imaging after the stencil is cut. This often detracts from the image transferred to the stone during the sand blasting or etching phase of the process.

The stencil of this invention is formed of a vinyl film material which includes incorporated fibers in the film web. The film is produced in thin sheet form which allows for easy cutting. The fibers strengthen the film sheet against abrasive forces and also provide resistance to deformation at elevated temperatures. As a result, clear, sharp images are transferred to the stone slab or other work surface.

Accordingly, it is an object of this invention to provide for a durable, easy to cut film stencil.

Another object is to provide a stone cutting stencil which allows clear, sharp images to be transferred to the stone.

Another object is to provide a film stencil which is easy to cut and further provides sufficient resistance to abrasion and temperature degradation.

Other objects will become apparent upon a reading of the following description.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize its teachings.

Figure 3:
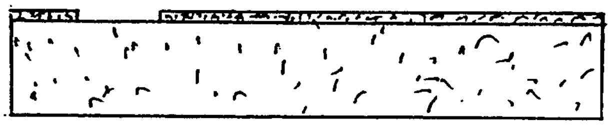
FIG. 3 is a sectional view taken along line 3—3 of FIG. 1.
Figure 2:
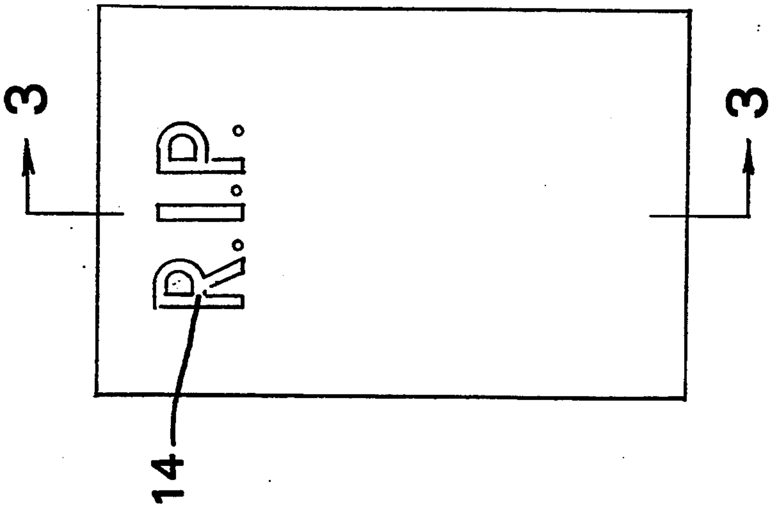
FIG. 2 is a plan view of the stencil with portions cut out to allow stone surface etching or blasting.
Figure 1:
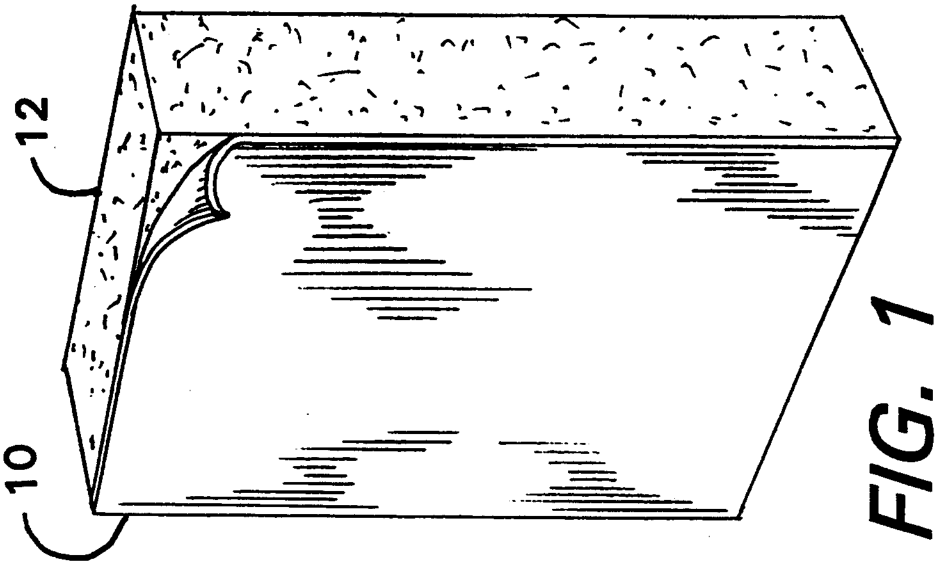
FIG. 1 is a perspective view of the stencil of this invention shown attached to a stone slab.

Referring first to FIGS. 1–3, reference numeral 10 depicts a stencil constructed according to the principles of this invention. Stencil 10 is shown in use on a stone slab 12 and is generally utilized as shown in FIG. 2 where portions 14 are cut out from the stencil to expose the stone slab to blasting media (not shown) or other etching media. When stencil 10 is removed from slab 12 a clear sharp image can be viewed which corresponds to cut-out portions 14.

Stencil 10 is of a vinyl film construction and is preferably manufactured in sheet form. Polyvinyl chloride (PVC) resin is mixed with a plasticizer component to form a liquid plastisol. Additives may be added to the mixture to assist in the forming and/or stability of the film.

To the plastisol is added a quantity of fibrous material. A sufficient amount of this fibrous material is added so as to enhance the abrasion and temperature resistance of the resultant film for its intended use as described above.

The PVC resin used can be a single type of resin or a mixture of two or more types of PVC resins. The plasticizer used is preferably a phthalate plasticizer or a mixture of phthalates and is normally added to the resin at 50–90 parts by weight plasticizer for every 100 parts of resin or resin combination. The fibers are preferably ceramic fibers and are usually added to the plastisol mix with at least 50 parts by weight of fibers for every 100 parts by weight of resin. The quantity of fibers added to the plastisol will determine the amount of abrasion and temperature resistance which the film will exhibit. Some common additives which may be used are color stabilizers and wetting agents, among others, and are well known to those skilled in the film making art. A specific example of the formulation of the stencil 10 is seen in the following example.

EXAMPLE 50 pounds of a relatively high molecular weight PVC resin and 50 pounds of a relatively low molecular weight elastomeric PVC resin were mixed with 50 pounds of a 7–9 carbon atom phthalate plasticizer, 20 pounds of an 11 carbon atom phthalate plasticizer, 5 pounds of a commercial color stabilizer, 3.5 pounds of wetting agent, and 100 pounds of ceramic fibers to form a liquid plastisol. The plastisol was cast on a conventional silicone release liner so that the resultant film would be about 0.8 mm thick. The plastisol was then gelled and fused in an oven for approximately 3 minutes at 193° C.–197° C. The resulting film was then cooled and wound up into rolls. A pressure sensitive adhesive of a high shear vinyl acrylic latex was then applied to the vinyl film which was processed into both full width and cut rolls.

The ceramic fibers used in the example were obtained from The Carborundum Company of Niagara Falls, N.Y. and are sold commercially under the trademark Fiberfax. The basic composition of the fibers is $Al_2O_3$ and $SiO_2$, but other equivalent fibers can doubtless be utilized with equal results. The resultant film produced exhibits the properties which are highly valued in stencils of this nature—high abrasion and temperature resistance and ease in cutting and visual imaging. The optional pressure sensitive adhesive allows the stencil 10 to be adhered directly to the slab 12 as shown in the drawings and is easily peeled off when the operation is completed.

It is understood that the invention is not limited to the foregoing details, but may be modified within the scope of the following claims.

I claim:

1. A flexible but durable stencil for use in sand blasting a pattern onto a hard surface or similar operations, said stencil comprising a vinyl film sheet adapted to have portions easily cut out to expose a surface to be etched while portions not cut out protect a surface from being etched, said film sheet including a vinyl resin component, a plasticizer component, and a quantity of fibrous ceramic material incorporated therein in quantities sufficient to increase the abrasive strength of the film sheet to prevent degradation or destruction by high temperatures produced during sand blasting or similar operations which would otherwise occur.

2. The stencil of claim 1 wherein said film sheet includes 100 parts by weight of said resin component, 50-90 parts by weight of said plasticizer component, said fibrous material including 50 or more parts by weight of ceramic fibers.

3. The material of claim 2 and a pressure sensitive adhesive applied to one side of said stencil wherein the stencil may adhere directly to a surface to be etched.

4. An improved flexible sheet vinyl film stencil of the type having about 100 parts, vinyl resin component and about 50 to 90 parts plasticizer component, wherein the improvement comprises fibrous ceramic material incorporated therein in quantities of at least 50 parts and which is sufficient to increase the abrasive strength of the vinyl film sheet to prevent substantial degradation or destruction by high temperatures produced during sand blasting which would otherwise occur without the fibrous ceramic material.

* * * * *